United States Patent
Son et al.

(10) Patent No.: US 11,651,053 B2
(45) Date of Patent: May 16, 2023

(54) METHOD AND APPARATUS WITH NEURAL NETWORK TRAINING AND INFERENCE

(71) Applicant: SAMSUNG ELECTRONICS CO., LTD., Suwon-si (KR)

(72) Inventors: Minjung Son, Suwon-si (KR); Hyun Sung Chang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 136 days.

(21) Appl. No.: 17/190,965

(22) Filed: Mar. 3, 2021

(65) Prior Publication Data

US 2022/0108136 A1 Apr. 7, 2022

(30) Foreign Application Priority Data

Oct. 7, 2020 (KR) .......................... 10-2020-0129614

(51) Int. Cl.
| | |
|---|---|
| G06F 18/21 | (2023.01) |
| G06V 10/22 | (2022.01) |
| G06F 18/214 | (2023.01) |
| G06N 3/08 | (2023.01) |
| G10L 25/30 | (2013.01) |

(52) U.S. Cl.
CPC ...... G06F 18/2193 (2023.01); G06F 18/2148 (2023.01); G06N 3/08 (2013.01); G06V 10/22 (2022.01); G10L 25/30 (2013.01)

(58) Field of Classification Search
CPC ... G06F 18/2193; G06F 18/2148; G06N 3/08; G06V 10/22; G10L 25/30
See application file for complete search history.

(56) References Cited

U.S. PATENT DOCUMENTS

| | | |
|---|---|---|
| 10,374,863 B2 | 8/2019 | Xu et al. |
| 10,380,428 B2 | 8/2019 | Shekhar et al. |
| 2018/0024968 A1 | 1/2018 | Clinchant et al. |

(Continued)

FOREIGN PATENT DOCUMENTS

| | | |
|---|---|---|
| KR | 10-2018-0008445 A | 1/2018 |
| KR | 10-2019-0047576 A | 5/2019 |
| KR | 10-2019-0111631 A | 10/2019 |

OTHER PUBLICATIONS

Le, Lei, Andrew Patterson, and Martha White. "Supervised autoencoders: Improving generalization performance with unsupervised regularizers." *Advances in neural information processing systems* 31 (2018): 107-117. (11 pages in English).

(Continued)

*Primary Examiner* — Casey L Kretzer
(74) *Attorney, Agent, or Firm* — NSIP Law

(57) ABSTRACT

A processor-implemented method using a neural network (NN) includes: receiving input data; and determining information inferred from the input data based on state information about a state in which the NN is activated in response to the input data, wherein an embedding vector generated by encoding the input data using at least a portion of the NN comprises information used to reconstruct a first partial region of the input data with a first accuracy and to reconstruct a second partial region of the input data with a second accuracy, and wherein the first partial region is adaptively determined based on either one or both of the inferred information and the embedding vector.

35 Claims, 9 Drawing Sheets

(56) References Cited

U.S. PATENT DOCUMENTS

| | | |
|---|---|---|
| 2018/0247201 A1 | 8/2018 | Liu et al. |
| 2019/0073594 A1 | 3/2019 | Eriksson et al. |
| 2019/0080440 A1 | 3/2019 | Eriksson et al. |
| 2019/0095798 A1 | 3/2019 | Baker |
| 2019/0189143 A1 | 6/2019 | Disch et al. |
| 2019/0392304 A1 | 12/2019 | Aliper et al. |
| 2021/0374548 A1* | 12/2021 | Reisswig ............... G06N 3/08 |
| 2022/0092395 A1* | 3/2022 | Murata ............... G06N 3/082 |

OTHER PUBLICATIONS

Chartsias, Agisilaos, et al. "Factorised Spatial Representation Learning: Application in Semi-supervised Myocardial Segmentation." *International Conference on Medical Image Computing and Computer-Assisted Intervention Springer Nature Switzerland, Cham*, 2018 (9 pages in English).

Tong, Li, et al. "CAESNet: Convolutional AutoEncoder based Semi-supervised Network for improving multiclass classification of endomicroscopic images." *Journal of the American Medical Informatics Association vol. 26 Issue 11* 2019 (12 pages in English).

Zhou, Yi, et al. "Collaborative Learning of Semi-Supervised Segmentation and Classification for Medical Images." *Proceedings of the IEEE/CVF conference on computer vision and pattern recognition* 2019 (10 pages in English).

Sari, C. Taylan et al. "Image Embedded Segmentation: Uniting Supervised and Unsupervised Objectives for Segmenting Histopathological Images." *arXiv:2001.11202v2* May 21, 2020 (10 pages in English).

Extended European Search Report dated Jan. 3, 2022 in counterpart European Patent Application No. 21200386.7 (11 pages in English).

* cited by examiner

METHOD AND APPARATUS WITH NEURAL NETWORK TRAINING AND INFERENCE

CROSS-REFERENCE TO RELATED APPLICATIONS

This application claims the benefit under 35 USC § 119(a) of Korean Patent Application No. 10-2020-0129614, filed on Oct. 7, 2020, in the Korean Intellectual Property Office, the entire disclosure of which is incorporated herein by reference for all purposes.

BACKGROUND

1. Field

The following description relates to a method and apparatus with neural network training and inference.

2. Description of Related Art

A neural network-based method through training may be used in a field for high performance. However, it is important to enhance generality of training when a neural network-based algorithm is applied. In particular, a neural network model overfitted to input data or training data may fail to learn general statistics. Thus, the overfitted neural network may not enhance generality of training from limited input data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method using a neural network (NN) includes: receiving input data; and determining information inferred from the input data based on state information about a state in which the NN is activated in response to the input data, wherein an embedding vector generated by encoding the input data using at least a portion of the NN comprises information used to reconstruct a first partial region of the input data with a first accuracy and to reconstruct a second partial region of the input data with a second accuracy, and wherein the first partial region is adaptively determined based on either one or both of the inferred information and the embedding vector.

The determining of the inferred information may include any one of: determining pixel-wise information for each pixel included in the input data based on the state information; determining a region detected in the input data in a form of a detection window based on the state information; and determining a class classified from the input data based on the state information.

The input data may include either one of image data and voice data.

The input data may be image data, and the first partial region may include a region of interest (ROI) corresponding to the inferred information in the image data.

The input data may be voice data, and the first partial region may include a time interval of interest corresponding to the inferred information in the voice data.

The NN may be configured to infer either one of pixel-wise information and a detection window, and the first partial region may be adaptively determined as a partial region corresponding to the inferred information.

The NN may be configured to infer a class, and the first partial region may be adaptively determined as a partial region corresponding to the embedding vector.

The first accuracy may be greater than the second accuracy.

A non-transitory computer-readable storage medium may store instructions that, when executed by a processor, configure the processor to perform the method.

In another general aspect, a processor-implemented method using a neural network (NN) includes: receiving training data and a true label corresponding to the training data; extracting an embedding vector corresponding to the training data by encoding the training data; generating inference information of the NN by decoding the embedding vector using a first decoder; generating reconstruction information of the training data by decoding the embedding vector using a second decoder; determining a first loss based on a difference between the inference information and the true label; determining a first partial region in the training data corresponding to either one or both of the true label and the embedding vector; determining a second loss based on a difference between the training data and the reconstruction information based on the first partial region; and training the NN based on the first loss and the second loss.

The training of the NN may include training the NN to reconstruct the first partial region with a first accuracy and to reconstruct a second partial region in the training data with a second accuracy, based on the first loss and the second loss.

The first accuracy may be greater than the second accuracy.

The determining of the first partial region may include determining, as the first partial region, a partial region in the training data corresponding to the true label so that the NN is trained to infer either one of pixel-wise information and a detection window.

The determining of the first partial region may include determining, as the first partial region, a partial region corresponding to the embedding vector so that the NN is trained to infer a class.

The training of the NN may include training the NN to determine pixel-wise information for each pixel included in the training data, based on the first loss and the second loss.

The training of the NN may include training the NN to determine a region detected in the training data in a form of a detection window, based on the first loss and the second loss.

The training of the NN may include training the NN to determine a class classified from the training data, based on the first loss and the second loss.

The training data may include either one of image data and voice data.

The determining of the first partial region may include determining the first partial region to comprise a region of interest (ROI) reconstructed in the training data, in response to the training data being image data.

The determining of the first partial region may include determining the first partial region to comprise a time interval of interest reconstructed in the training data, in response to the training data being voice data.

The method may include: receiving input data; and determining, using the trained NN, information inferred from the input data based on state information about a state in which the NN is activated in response to the input data, wherein the first partial region is adaptively determined based on either one or both of the inferred information and the embedding vector.

In another general aspect, an apparatus using a neural network (NN) includes: a communication interface configured to receive input data; and a processor configured to determine information inferred from the input data based on state information about a state in which the NN is activated in response to the input data, wherein an embedding vector generated by encoding the input data using at least a portion of the NN may include information used to reconstruct a first partial region of the input data with a first accuracy and to reconstruct a second partial region of the input data with a second accuracy, and wherein the first partial region is adaptively determined based on either one or both of the inferred information and the embedding vector.

For the determining of the inferred information, the processor may be configured to: determine pixel-wise information for each pixel included in the input data based on the state information; determine a region detected in the input data in a form of a detection window based on the state information; or determine a class classified from the input data based on the state information.

The input data may include either one of image data and voice data.

The input data may be image data, and the first partial region may include a region of interest (ROI) corresponding to the inferred information in the image data.

The input data may be voice data, and the first partial region may include a time interval of interest corresponding to the inferred information in the voice data.

The NN may be configured to infer either one of pixel-wise information and a detection window, and the first partial region may be adaptively determined as a partial region corresponding to the inferred information.

The NN may be configured to infer a class, and the first partial region may be adaptively determined as a partial region corresponding to the embedding vector.

The first accuracy may be greater than the second accuracy.

The inference apparatus may include any one or any combination of a head-up display (HUD), a three-dimensional (3D) digital information display (DID), a navigation apparatus, a 3D mobile apparatus, and a smart vehicle.

In another general aspect, a processor-implemented method using a neural network (NN) includes: extracting an embedding vector by encoding training data; determining a first loss between a ground truth of the training data and either one of inference information and a class generated based on the embedding vector; generating reconstruction information of the training data by decoding the embedding vector; determining a first partial region in the training data corresponding to either one of the ground truth and the embedding vector; determining a second loss between the training data and a portion of the reconstruction information corresponding to the first partial region; and training the NN based on the first loss and the second loss.

The method may include: generating the inference information by decoding the embedding vector; and generating the class by classifying the inference information, wherein the first loss is between the ground truth and either one of inference information and the class.

The method may include: generating the class by classifying the embedding vector, wherein the first loss is between the ground truth and either one of inference information and the class.

The first partial region may correspond to an adaptive weight of the ground truth, and the portion of the reconstruction information corresponding to the first partial region may be determined by multiplying the reconstruction information by the adaptive weight.

The training of the NN may include training the NN to minimize a weighted sum of the first loss and the second loss.

Other features and aspects will be apparent from the following detailed description, the drawings, and the claims.

Figure 1:
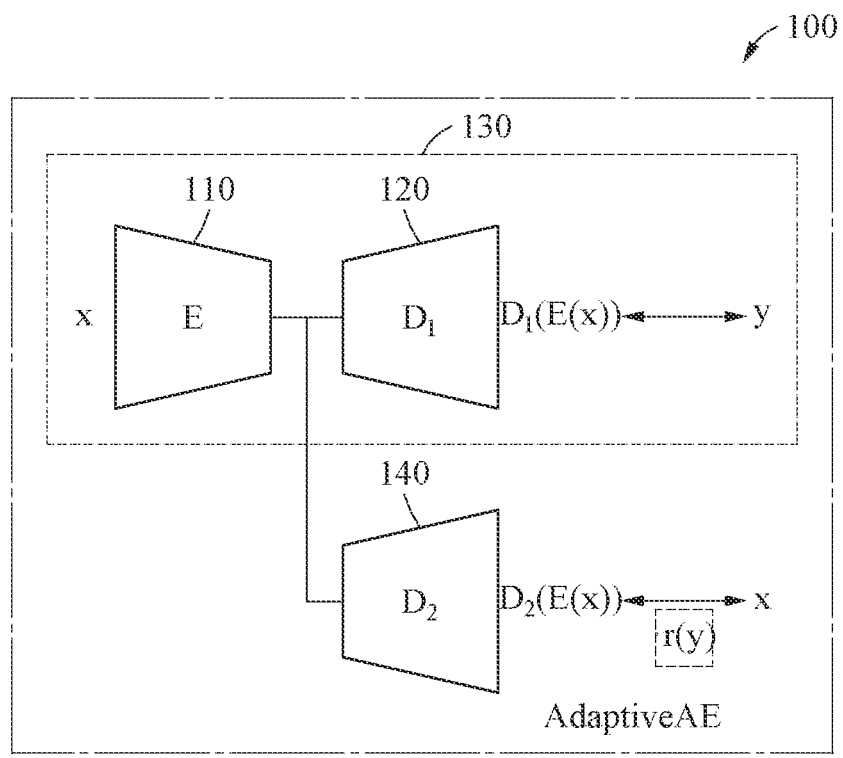
FIG. 1 illustrates an example of a method of increasing generality in a training apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, examples will be described in detail with reference to the accompanying drawings. Various modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical and scientific terms used herein have the same meaning as commonly understood by one of ordinary skill in the art to which this disclosure pertains consistent with and after an understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

A component having a common function with a component included in one example is described using a like name in another example. Unless otherwise described, description made in one example may be applicable to another example and detailed description within a duplicate range is omitted.

FIG. 1 illustrates an example of a method of increasing generality in a training apparatus. FIG. 1 illustrates a configuration of a training apparatus 100 for inference using an artificial neural network (ANN).

The training apparatus 100 may include a neural network 130 that is configured to generate a feature or code using an encoder E 110 and to infer an encoded feature using a first decoder $D_1$ 120. The training apparatus 100 may further include a second decoder $D_2$ 140 for adaptive autoencoding.

The encoder E 110 may generate a feature vector E(x) (an embedding vector, for example) or code corresponding to training data x. The first decoder $D_1$ 120 may infer a label of training data by decoding the feature vector or code generated by the encoder E 110. The encoder E 110 and the first decoder $D_1$ 120 may be trained by a first loss that minimizes a difference between a label $D_1$ (E(x)) of the training data inferred by the first decoder $D_1$ 120 and ground truth data y.

Also, the second decoder $D_2$ 140 may restore training data by decoding the feature vector or code generated by the encoder E 110. The encoder E 110 and the second decoder $D_2$ 140 may be trained by a second loss that minimizes a difference between training data $D_2$(E(x)) reconstructed by the second decoder $D_2$ 140 and the training data x.

The second decoder $D_2$ 140 may be adaptively guided or restricted to reconstruct a portion, for example, an important portion r(y), of the training data x, instead of all portions corresponding to the training data x. In this example, the training apparatus 100 may be trained by a second loss defined to minimize a difference between the training data x and an important region reconstructed by the second decoder $D_2$ 140. Accordingly, the second decoder $D_2$ 140 may reconstruct a portion corresponding to an important region of input data with a high accuracy, in comparison to a portion that does not correspond to the important region. The term "accuracy" used herein may refer to a reconstruction accuracy and may also be represented as a "similarity".

The important portion r(y) may be adaptively determined based on a local importance of the training data x. The important portion r(y) may perform a function of masking to distinguish an important portion corresponding to a portion of the training data x.

For example, when training data is image data, an important portion may be determined based on a spatial importance. In an example, when training data is image data, an important portion may correspond to a region of interest (ROI) of a user in the image data. In another example, when training data is audio data such as voice data, an important portion may be determined based on a temporal importance. When training data is voice data, an important portion may correspond to a time interval of interest in the voice data in which a main speaker utters.

Hereinafter, methods of defining or setting an important portion (for example, an ROI) are described. In an example, the ROI may be defined by each pixel value of a target image based on pixel-wise information and may be denoted by r(y). In this example, the target image may be referred to as a "ground truth image". The ROI may be defined by location information of a target image detected using a detection window.

In another example, the ROI may be defined through a classification of a feature activation region. In this example, the ROI may be indicated as r(E(x)).

In an example, by a second loss value additionally defined by the second decoder $D_2$ 140, the training apparatus 100 of one or more embodiments may reduce a load provided to the ANN in comparison to a typical training apparatus that may reconstruct the entire training data x, and the training apparatus 100 of one or more embodiments may enhance generality in the important region of the training data x. Also, by restricting a reconstruction region by the second decoder $D_2$ 140, the training apparatus 100 of one or more embodiments may minimize an additional overhead of a neural network of the second decoder $D_2$, to prevent a decrease in training performance. As a result, the training apparatus 100 of one or more embodiments may enhance the overall performance of the ANN and prevent overfitting of the ANN even though a large quantity of input data is not used.

The training apparatus 100 of one or more embodiments may generate a feature or code with a dimension reduced in comparison to the training data x, may reduce a dimension of data through a process of reconstructing the feature, and may prevent an occurrence of artifacts such as noise. Also, an autoencoder including the encoder E 110 and the second decoder $D_2$ 140 may generate a generally meaningful feature. Since result data corresponding to a target to be trained and supervised learning is identical to training data, the autoencoder of one or more embodiments may not need to make an extra effort to obtain the result data, and may enhance generality of a feature to be trained.

Figure 2:
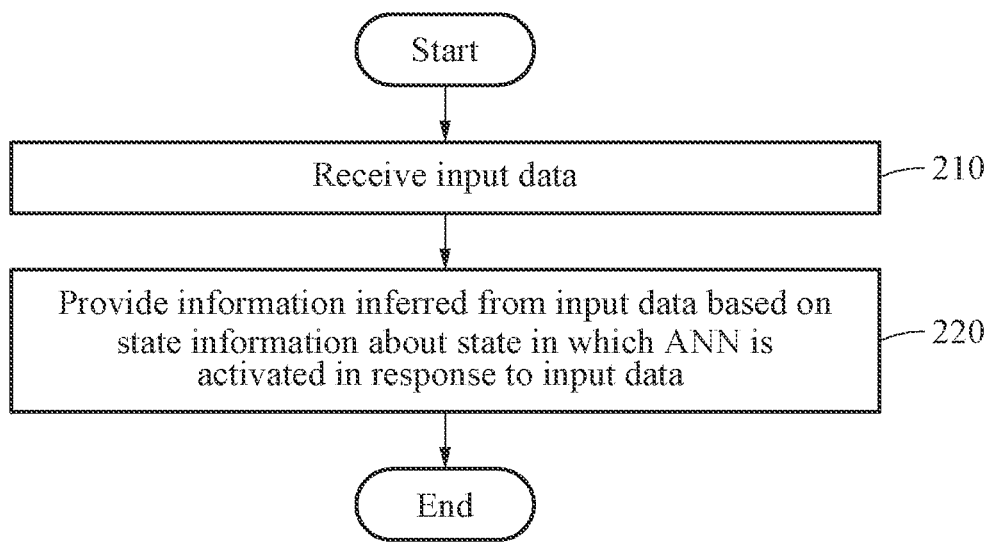
FIG. 2 illustrates an example of an inference method.

FIG. 2 illustrates an example of an inference method. Referring to FIG. 2, in operation 210, an inference apparatus may receive input data. The input data may include, for example, image data or voice data, but is not limited thereto. The inference apparatus may receive input data using, for example, a communication interface 1010 of FIG. 10.

In operation 220, the inference apparatus may provide or determine information inferred from the input data based on state information about a state in which an ANN is activated in response to the input data received in operation 210.

The state information may correspond to, for example, information indicating an internal state of nodes constituting the ANN. The internal state of the nodes may include information (for example, spatial information and/or temporal information) obtained by accumulating information processed in a previous time by a feedback structure of a neural network. The state information may be information in a form of a vector (for example, a hidden state vector). The state information may also be referred to as "hidden state information."

The state information may correspond to, for example, a combination of feature activation regions. For example, when an image is input to a convolutional neural network (CNN), a feature map may be generated through a plurality of filters that perform filtering of a lane, a vehicle, and/or a pedestrian, as non-limiting examples.

An embedding vector generated by encoding input data using at least a portion of the ANN in the inference apparatus may include information that is used to reconstruct a first partial region in the input data with a first accuracy and reconstruct a second partial region in the input data with a second accuracy. For example, the first accuracy may be greater than the second accuracy. In this example, at least a portion of the ANN may correspond to a portion of layers that operates as an encoder in the ANN.

The first partial region may be adaptively determined based on information inferred from the input data and output by the ANN, state information generated in the ANN, or a combination thereof.

In an example, when the ANN is designed to infer pixel-wise information or a detection window, the first partial region of the input data may be adaptively determined based on information inferred by the ANN. For example, when the ANN is designed to infer pixel-wise information or a detection window, the first partial region of the input data may be adaptively determined as a partial region corresponding to information (for example, the pixel-wise information or the detection window) inferred by the ANN.

In another example, when the ANN is designed to infer a class, the first partial region of the input data may be adaptively determined based on an embedding vector generated by an encoder of the ANN. When the ANN is designed to infer a class, the first partial region of the input data may be adaptively determined as a partial region corresponding to the embedding vector generated by the encoder. For example, a plurality of filters may be used to generate a plurality of channels and the ANN may select regions (for example, feature activation regions in which features are activated) from which relatively high values are output for each of the channels. The ANN may set an ROI by combining overlapping regions among the regions from which relatively high values are output for each of the channels. The state information may correspond to, for example, a pixel-wise map $r(E(x))$ that reflects the ROI that will be described below.

The first partial region may correspond to an ROI in the input data, and the second partial region may correspond to regions other than the ROI in the input data. In an example, when the input data is image data, the first partial region may include an ROI corresponding to the inferred information in the image data. In another example, when the input data is voice data, the first partial region may include a time interval of interest corresponding to the inferred information in the voice data.

Information included in the embedding vector may be verified using a second decoder that is used in a training process and is not used in an inference process. The second decoder may reconstruct the input data from the embedding vector with a high accuracy corresponding to the first partial region in comparison to the second partial region.

In operation 220, the inference apparatus may provide, based on the state information, pixel-wise information for each pixel included in the input data, provide a region detected in the input data in a form of a detection window, and/or provide a class classified from the input data. In operation 220, the information inferred from the input data may correspond to, for example, an ROI such as a lane, a vehicle, or a pedestrian, and/or a voice section of a speaker of interest.

The inference apparatus may include, but is not limited to, for example, a head-up display (HUD), a three-dimensional (3D) digital information display (DID), a navigation apparatus, a 3D mobile apparatus, and/or a smart vehicle.

Figure 3:
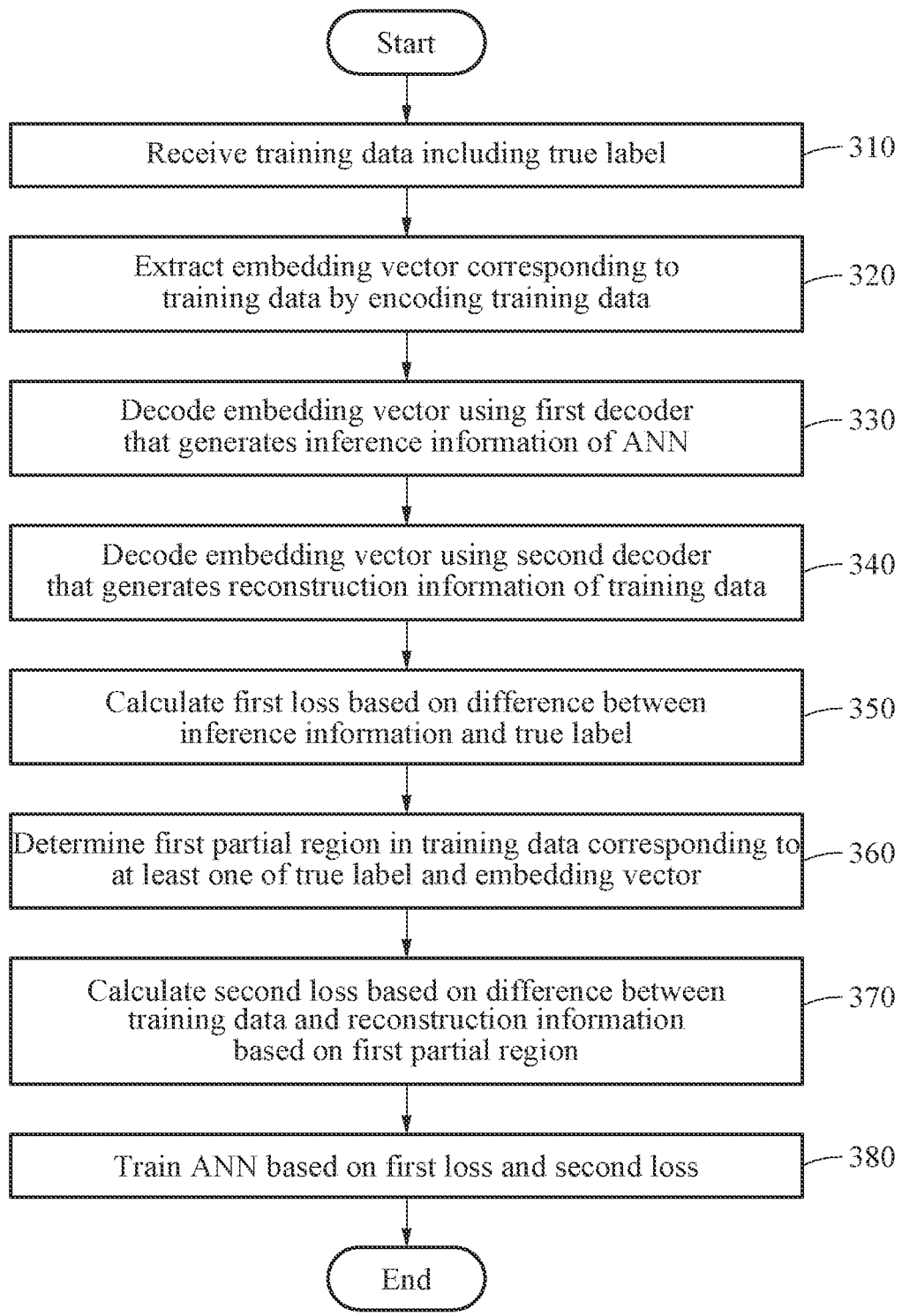
FIG. 3 illustrates an example of a training method.

FIG. 3 illustrates an example of a training method. Referring to FIG. 3, in operation 310, a training apparatus may receive training data (training data x, for example) including a true label (ground truth data y, for example). The training data may include, but is not limited to, for example, either image data or voice data.

In operation 320, the training apparatus may extract an embedding vector (a feature vector, for example) corresponding to the training data received in operation 310, by encoding the training data (using an encoder, for example).

In operation 330, the training apparatus may decode the embedding vector extracted in operation 320 using a first decoder that generates inference information (a label $D_1(E(x))$, for example) of an ANN. The training apparatus may generate the inference information by decoding the embedding vector using the first decoder. In operation 350, the training apparatus may calculate a first loss based on a difference between the inference information of the ANN and the true label included in the training data.

In operation 340, the training apparatus may decode the embedding vector extracted in operation 320 using a second decoder that generates reconstruction information (reconstructed training data $D_2(E(x))$, for example) of the training data received in operation 310. The training apparatus may generate the reconstruction information of the training data by decoding the embedding vector using the second decoder.

In operation 360, the training apparatus may determine a first partial region in the training data corresponding to the true label, or a first partial region corresponding to an embedding vector generated due to the training data (for example, the embedding vector extracted in operation 320). In an example, when the training data is image data, the first partial region may include an ROI reconstructed in the training data. In another example, when the training data is voice data, the first partial region may include a time interval of interest reconstructed in the training data.

In an example, when the training data is image data, the training apparatus may determine a partial region in the training data corresponding to the true label as the first partial region so that the ANN may infer pixel-wise information or a detection window. In another example, when the ANN is designed to infer a class, training may be performed using a target label corresponding to a training image. In this example, when a target image corresponding to the training image is absent, a typical training apparatus may not obtain pixel-wise information corresponding to such target image. In contrast, the training apparatus of one or more embodiments may perform training so that the ANN may infer a class corresponding to an ROI using activation information (for example, an embedding vector) of a feature extracted using the encoder.

In operation 360, the training apparatus may reconstruct the first partial region in the training data. For example, the training apparatus may reconstruct the first partial region in the training data by adaptively decoding a feature vector based on pixel-wise information extracted for each pixel from the training data. Non-limiting examples in which the training apparatus reconstructs the first partial region in the training data based on pixel-wise information extracted for each pixel will be further described below with reference to FIGS. 4 through 7.

For example, the training apparatus may reconstruct the first partial region in the training data by adaptively decoding an embedding vector (for example, the embedding vector extracted in operation 320) based on a region detected in the training data by a detection window. Non-limiting examples in which the training apparatus reconstructs the first partial region in the training data based on the region detected by the detection window will be further described below with reference to FIGS. 4 through 7.

Since an ROI may be directly defined and the first partial region may be determined in both the above pixel-wise information-based method and the above detection window-based method, all examples of FIGS. 4 through 7 may be used in the pixel-wise information-based method or the detection window-based method. Although examples of FIGS. 4 and 5 differ from examples of FIGS. 6 and 7 in whether two decoding networks share at least a portion of decoding layers, the other parts may equally be applicable to the examples of FIGS. 4 through 7.

The training apparatus may reconstruct the first partial region in the training data by adaptively decoding a feature vector based on a feature map corresponding to a class classified from the training data by a classifier. Non-limiting examples in which the training apparatus reconstructs the first partial region in the training data based on a feature map corresponding to a class classified from the training data will be further described below with reference to FIGS. 6 through 9.

In operation 370, the training apparatus may calculate a second loss based on a difference between the training data and reconstruction information (for example, the reconstruction information generated in operation 340) based on the first partial region determined in operation 360. As described above, the reconstruction information based on the first partial region may correspond to a detection window or pixel-wise information inferred by the ANN, or may correspond to a class inferred by the ANN.

In operation 380, the training apparatus may train the ANN based on the first loss calculated in operation 350 and the second loss calculated in operation 370. For example, the training apparatus may train the first decoder and the encoder based on the first loss, and may train the second decoder and the encoder based on the second loss. Thus, the encoder may be trained to generate an embedding vector that includes information used to reconstruct the first partial region with a first accuracy and reconstruct a second partial region in the training data with a second accuracy. In this example, the first accuracy may be greater than the second accuracy.

For example, when software or an algorithm for training-based detection, localization or semantic segmentation is included in the above-described inference apparatus, the training method may be used to train the ANN in advance so that generality may be guaranteed even when implemented in various environments later. Also, the training method may be used to perform training so that generality may be guaranteed without overfitting even with a minimum quantity of device data during on-device training.

Hereinafter, for convenience of description, an example in which training data is image data will be described, but is not limited thereto.

Figure 4:
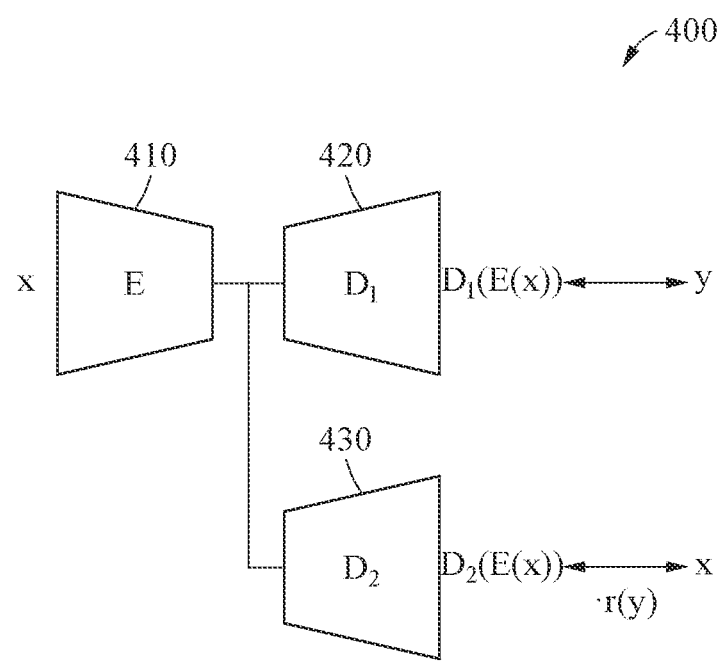
FIG. 4 illustrates an example of a configuration of a training apparatus.
Figure 5:
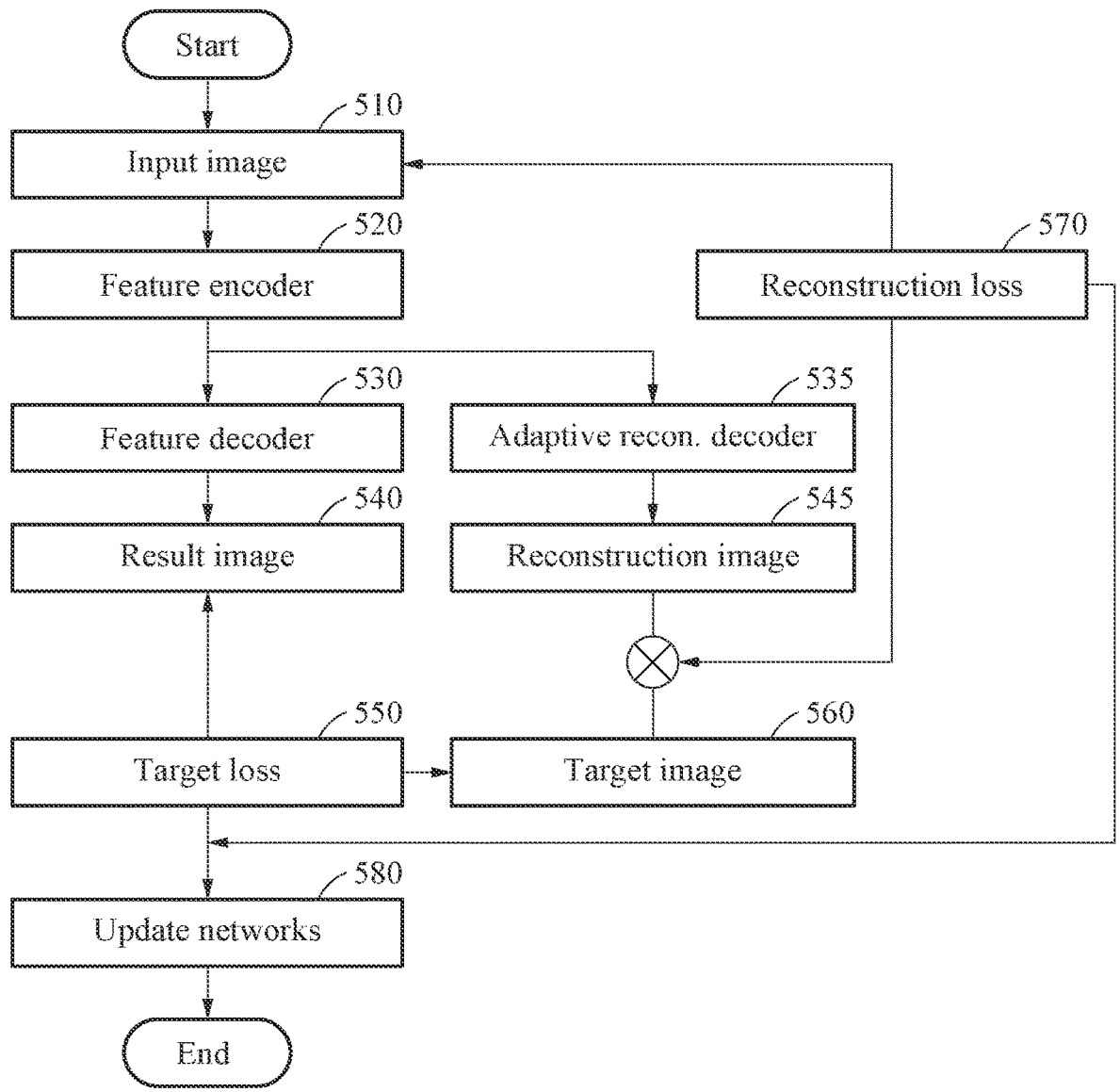
FIG. 5 illustrates an example of a training process of a training apparatus.

FIG. 4 illustrates an example of a configuration of a training apparatus 400, and FIG. 5 illustrates an example of a training process of a training apparatus (for example, the training apparatus 400 of FIG. 4). Referring to FIG. 4, the training apparatus 400 may include an encoder E 410, a first decoder $D_1$ 420, and a second decoder $D_2$ 430.

The training apparatus 400 may add the second decoder $D_2$ 430 to an ANN with a network structure including the encoder E 410 and the first decoder $D_1$ 420, to enhance generality. The encoder E 410 may generate a target image by pixel-wise outputting values for the training image x.

The first decoder $D_1$ 420 may infer predetermined information (for example, a label corresponding to training data) corresponding to an embedding vector generated by the encoder E 410. The second decoder $D_2$ 430 may reconstruct information corresponding to a portion of training data (for example, the training image x).

The training apparatus 400 may train the ANN to extract pixel-wise information from the training image x or to detect the pixel-wise information.

Extraction of general pixel-wise information may be based on a structure of a neural network including an encoder and a decoder, and a feature generated by a training image passing through the encoder may pass through the decoder, to generate a final result image.

In the following description, a training image may be denoted by x, a target image or a ground truth image corresponding to the training image may be denoted by y, an encoder may be denoted by E, a first decoder may be denoted by $D_1$, and a second encoder may be denoted by $D_2$.

In operation 510, the training apparatus 400 may receive a pair {Input x, Target y} of the training image x and the target image or the ground truth image y corresponding to the training image x. In operation 520, the training apparatus 400 may extract an embedding vector E(x) corresponding to the training image x by applying the training image x to the encoder E 410.

The training apparatus 400 may apply the embedding vector E(x) to the first decoder $D_1$ 420 in operation 530, and may thereby generate a result image $D_1(E(x))$ in operation 540. Depending on examples, the first decoder $D_1$ 420 may be a detector or operations of the first decoder $D_1$ 420 may be performed by the detector.

In operation 550, the training apparatus 400 may calculate a target loss corresponding to a difference (for example, Diff($D_1(E(x))$, y)) between the result image $D_1(E(x))$ passing through the first decoder $D_1$ 420 and the target image y 560.

In addition to the target loss, the second decoder $D_2$ 430 that is an adaptive reconstruction decoder may be further included. The training apparatus 400 may pass the embedding vector E(x) generated by the encoder E 410 through the second decoder $D_2$ 430 in operation 535, and may thereby generate a reconstruction image $D_2(E(x))$ in operation 545. For example, when the reconstruction image $D_2(E(x))$ is multiplied by an adaptive weight r(y) of each pixel defined from the target image y, the same effect as if a weight corresponding to important information activated in the target image y is assigned to the reconstruction image $D_2(E(x))$ may be obtained. In this example, the adaptive weight r(y) may correspond to, for example, a pixel-wise map reflecting an ROI in the training image. For example, the adaptive weight r(y) may be a binary mask with a value of "0" or "1", or a weight or importance with a real number value that gradually changes in a boundary portion of an ROI.

In operation 570, the training apparatus 400 may calculate a reconstruction loss defined as a difference (for example, Diff($D_2(E(x))\cdot r(y)$, x)) between the training image x and an image $D_2(E(x))\cdot r(y)$ adaptively reconstructed by the adaptive weight r(y). The reconstructed image $D_2(E(x))\cdot r(y)$ may correspond to a partial region (first partial region) of the training image x, for example, an ROI of the training image x.

In operation 580, the training apparatus 400 may train the ANN to minimize the reconstruction loss together with the above-described target loss. For example, the training apparatus 400 may train the ANN to minimize a sum (for example, a weighted sum) of a reconstruction loss and a target loss for a full set of training data.

Figure 6:
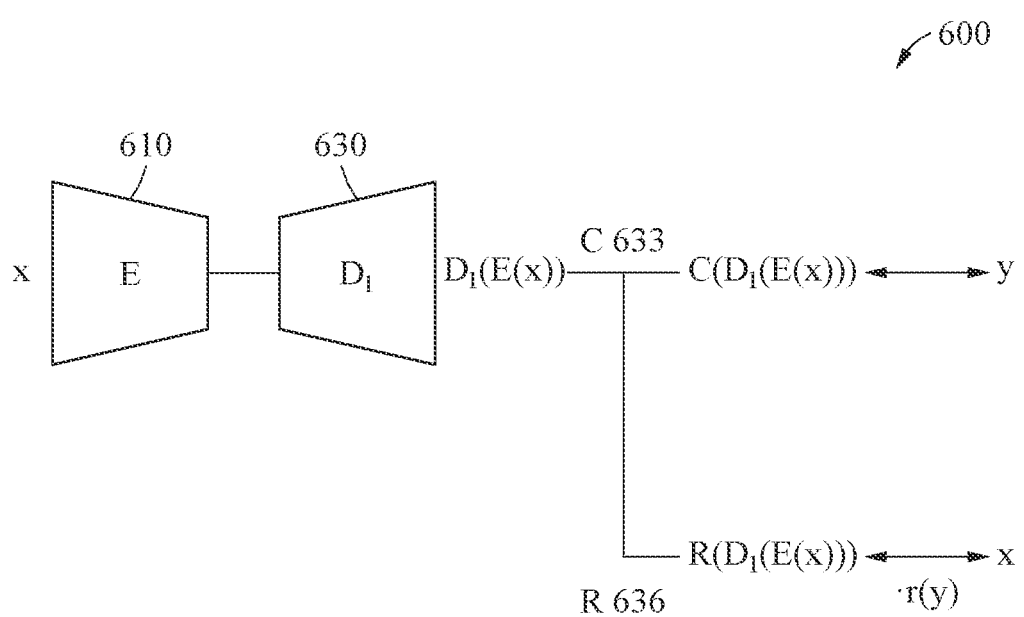
FIG. 6 illustrates another example of a configuration of a training apparatus.
Figure 7:
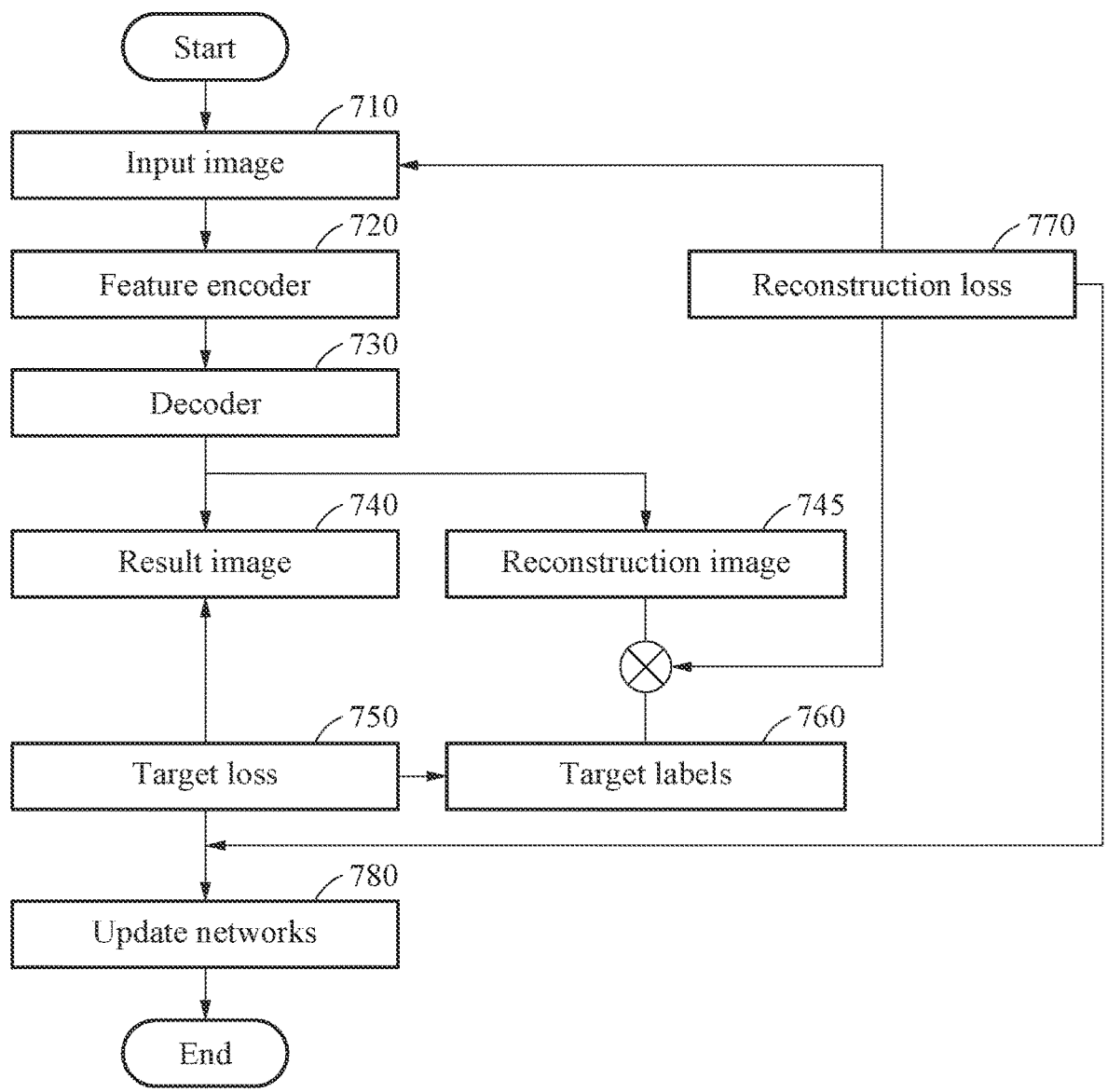
FIG. 7 illustrates an example of a training process of a training apparatus.

FIG. 6 illustrates an example of a configuration of a training apparatus 600, and FIG. 7 illustrates an example of a training process of a training apparatus (for example, the training apparatus 600 of FIG. 6). Referring to FIG. 6, the training apparatus 600 may include an encoder E 610, and a decoder $D_1$ 630.

The decoder $D_1$ 630 may be at least a portion of layers shared between two separated decoders, that is, the first decoder $D_1$ 420 and the second decoder $D_2$ 430 of FIG. 4. The training apparatus 600 may further include a classifier C 633 connected to the decoder $D_1$ 630, and an adaptive reconstruction decoder R 636. For example, the decoder $D_1$ 630 may simultaneously operate in conjunction with the classifier C 633 and the adaptive reconstruction decoder R 636. Depending on examples, the classifier C 633 may also operate as a detector. Hereinafter, for convenience of description, a classification operation will be described, and may also be applied to an example when the classifier C 633 operates as a detector.

In operation 710, the training apparatus 600 may receive a pair {Input x, Target y} of a training image x and a target label or a true label y corresponding to the training image x. In operation 720, the training apparatus 600 may extract an embedding vector E(x) corresponding to the training image x by applying the training image x to the encoder E 610.

The training apparatus 600 may decode the embedding vector E(x) using the decoder $D_1$ 630 in operation 730, and may thereby generate a result image $D_1(E(x))$ in operation 740. The training apparatus 600 may pass the result image $D_1(E(x))$ passing through the decoder $D_1$ 630 to pass through the classifier C 633, and may thereby obtain a classified class $C(D_1(E(x)))$. In operation 750, the training apparatus 600 may calculate a target loss corresponding to a difference (for example, Diff($C(D_1(E(x)))$, y)) between the class $C(D_1(E(x)))$ and a target label y 760.

In operation 745, the training apparatus 600 may generate a reconstruction image $R(D_1(E(x)))$ by allowing the result image $D_1(E(x))$ passing through the decoder $D_1$ 630 to pass through the adaptive reconstruction decoder R 636. For example, when the reconstruction image $R(D_1(E(x)))$ is multiplied by an adaptive weight r(y) of each pixel defined from the target label y 760, the same effect as if a weight corresponding to important information activated in the target label y is assigned to the reconstruction image $R(D_1(E(x)))$ may be obtained. In this example, the adaptive weight r(y) may correspond to, for example, a pixel-wise map reflecting an ROI, as described above. Also, the adaptive weight r(y) may be, for example, a binary mask with a value of "0" or "1", or a weight with a real number value that gradually changes in a boundary portion of an ROI.

In operation 770, the training apparatus 600 may calculate a reconstruction loss defined as a difference (for example, Diff($R(D_1(E(x)))\cdot r(y)$, x)) between the training image x and an image $R(D_1(E(x)))\cdot r(y)$ that is adaptively reconstructed by the adaptive weight r(y). The reconstructed image $R(D_1(E(x)))\cdot r(y)$ may correspond to a partial region (first partial region) of the training image x, for example, an ROI of the training image x.

In operation 780, the training apparatus 600 may train an ANN to minimize the reconstruction loss together with the above-described target loss. For example, the training apparatus 600 may train the ANN to minimize a sum (for example, a weighted sum) of a reconstruction loss and a target loss for a full set of training data.

Since the training apparatus 600 uses the same decoder $D_1$ 630 and separately generates two last results (for example, the classified class $C(D_1(E(x)))$ and the reconstruction image $R(D_1(E(x)))$), a number of weights of the ANN that are trained is less than a training apparatus that uses an additional second decoder, for example. Thus, it the training apparatus 600 may reduce a load of the ANN.

Figure 8:
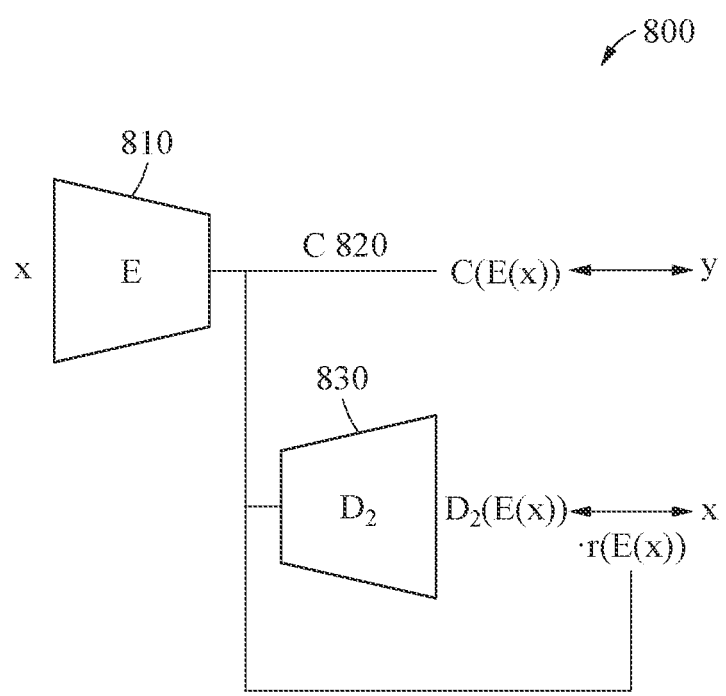
FIG. 8 illustrates another example of a configuration of a training apparatus.
Figure 9:
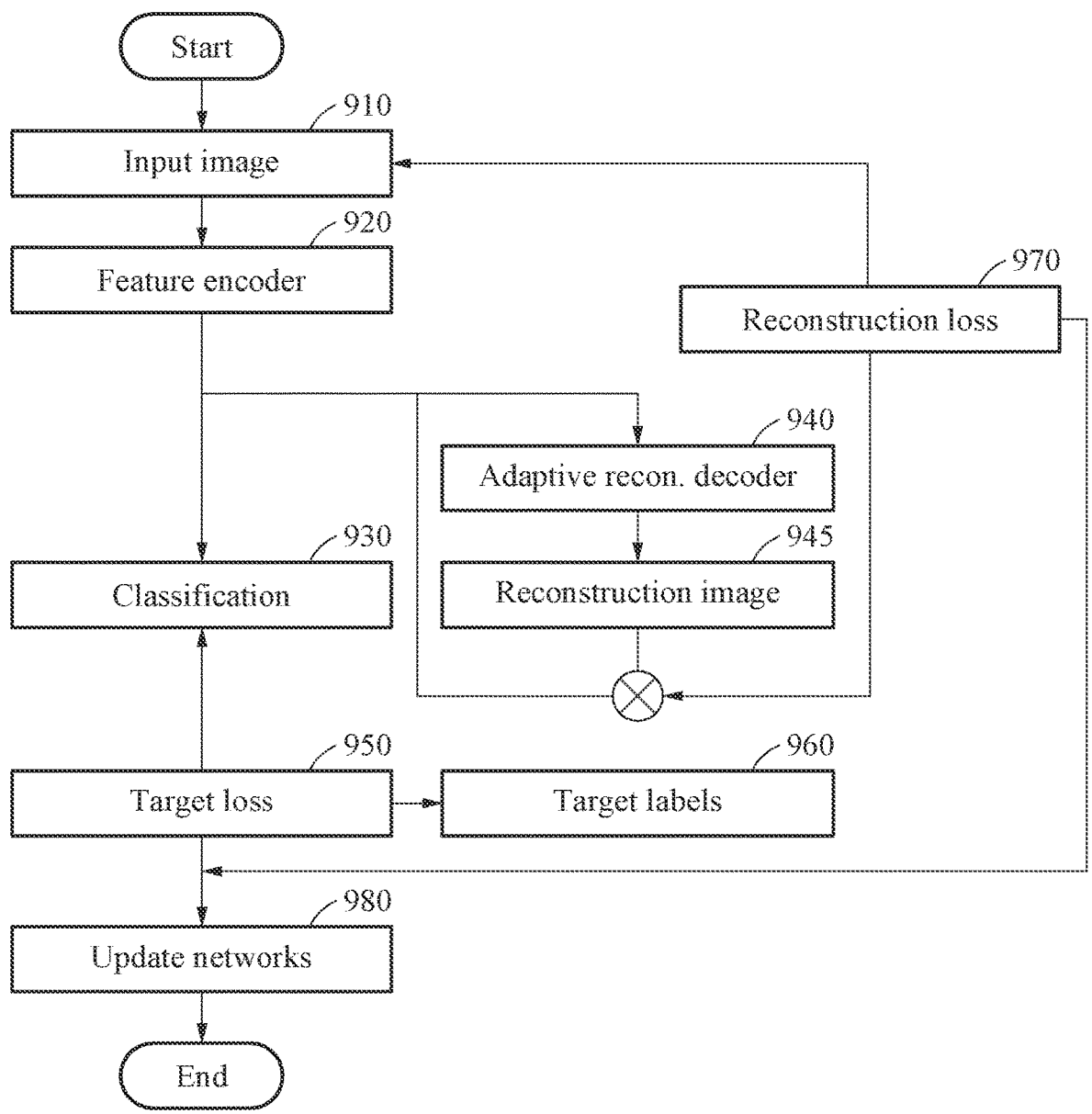
FIG. 9 illustrates an example of a training process of a training apparatus.

FIG. 8 illustrates an example of a configuration of a training apparatus 800, and FIG. 9 illustrates an example of a training process of a training apparatus (for example, the training apparatus 800 of FIG. 8).

Referring to FIG. 8, the training apparatus 800 may include an encoder E 810 and a decoder $D_2$ 830. At least a portion of layers of the encoder E 810 may operate as a classifier C 820.

In operation 910, the training apparatus 800 may receive a pair {Input x, Target y} of a training image x and a target label or a true label y corresponding to the training image x. In operation 920, the training apparatus 800 may extract an embedding vector E(x) corresponding to the training image x by allowing the training image x to pass through the encoder E 810.

In operation 930, the training apparatus 800 may classify a class C(E(x)) corresponding to the embedding vector E(x) by allowing the embedding vector E(x) to pass through the classifier C 820.

In operation 950, the training apparatus 800 may calculate a target loss corresponding to a difference (for example, Diff(C(E(x)), y)) between the classified class C(E(x)) and a target label or a true label y 960 corresponding to the training image x.

The training apparatus 800 may allow the embedding vector E(x) extracted from the encoder E 810 to pass through the decoder $D_2$ 830 in operation 940, and may thereby generate a reconstruction image $D_2(E(x))$ in operation 945. For example, the decoder $D_2$ 830 may operate as an adaptive reconstruction decoder (for example, the second decoder $D_2$ 430 of FIG. 4). In this example, the training apparatus 800 may multiply the reconstruction image $D_2(E(x))$ by a pixel-wise map r(E(x)) defined from the embedding vector E(x), to obtain the same effect as if a weight is assigned to important information, for example, an ROI. Also, the pixel-wise map r(E(x)) may correspond to a combination of feature activation regions, and may reflect an ROI.

Since the target label or the true label y 960 corresponding to the training image x is used in the examples of FIGS. 8 and 9, a target image may be absent. However, even when a weight based on pixel-wise information is not directly defined because target image is absent, the training apparatus 800 may define the pixel-wise map r(E(x)) based on activation information (for example, feature activation regions) of features extracted for classification in the examples of FIGS. 8 and 9.

In operation 970, the training apparatus 800 may calculate a reconstruction loss defined as a difference (for example, Diff($D_2(E(x)) \cdot r(E(x))$, x)) between the training image x and an image $D_2(E(x)) \cdot r(E(x))$ that is adaptively reconstructed by the pixel-wise map r(E(x)) reflecting the ROI. The adaptively reconstructed image $D_2(E(x)) \cdot r(E(x))$ may correspond to a partial region (first partial region) of the training image x, for example, an ROI of the training image x.

In operation 980, the training apparatus 800 may train an ANN to minimize the reconstruction loss together with the above-described target loss. For example, the training apparatus 800 may train the ANN to minimize a sum (for example, a weighted sum) of a reconstruction loss and a target loss for a full set of training data.

Figure 10:
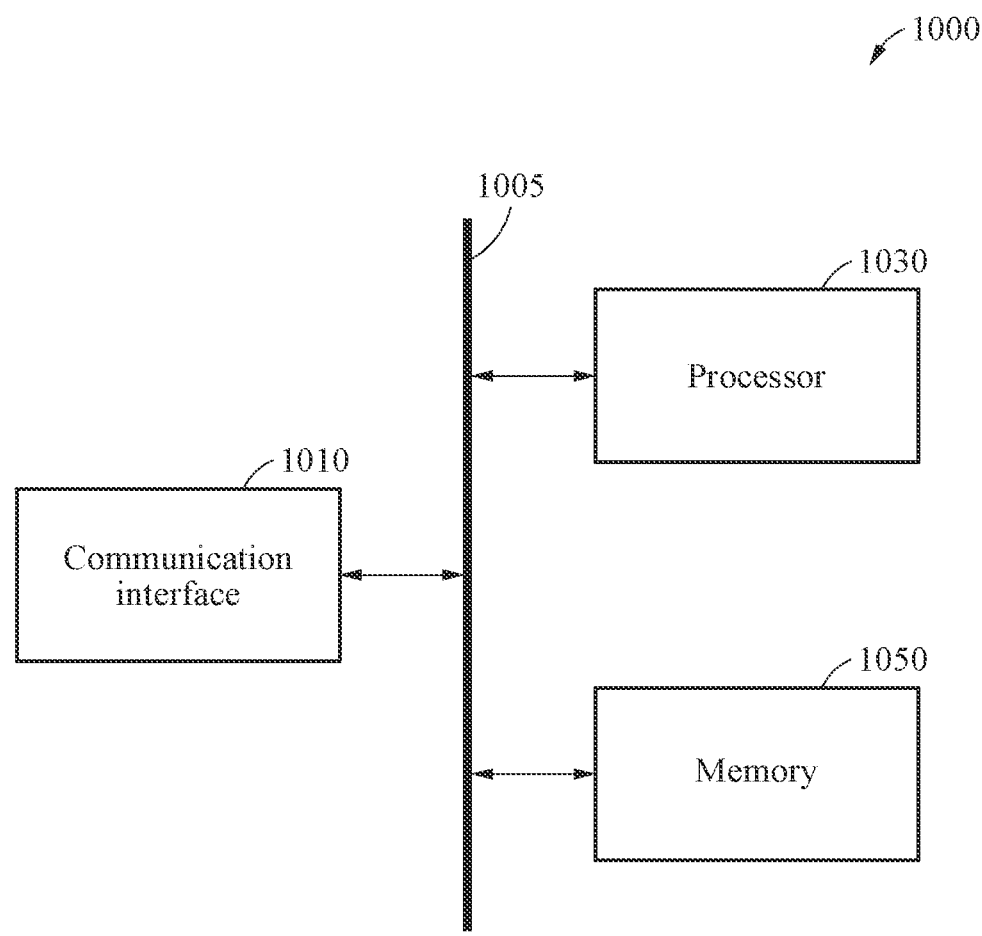
FIG. 10 illustrates an example of an inference apparatus.

FIG. 10 illustrates an example of an inference apparatus 1000. Referring to FIG. 10, the inference apparatus 1000 includes the communication interface 1010, a processor 1030 (for example, one or more processors), and a memory 1050 (for example, one or more memories). The communication interface 1010, the processor 1030, and the memory 1050 may be connected to each other via a communication bus 1005. The inference apparatus 1000 may correspond to, for example, a HUD, a 3D DID, a navigation apparatus, a 3D mobile apparatus or a smart vehicle.

The communication interface 1010 may receive an input image. The input data may be, for example, image data or voice data. The image data may include, but is not limited to, for example, a traveling image acquired by capturing front, rear, left and/or right sides of a vehicle while the vehicle is traveling. The voice data may include, but is not limited to, for example, voice of a speaker uttered during a predetermined period of time.

The processor 1030 may provide information inferred from the input data based on state information about a state in which an ANN is activated, in response to the input data received by the communication interface 1010. The inferred information may include, for example, an image including an object corresponding to an ROI, or voice of a speaker corresponding to a target of interest.

An embedding vector generated by encoding input data using at least a portion of the ANN may include information that is used to reconstruct a first partial region in the input data with a first accuracy and reconstruct a second partial region in the input data with a second accuracy. The first partial region may be adaptively determined based on at least one of the state information and the inferred information by the processor 1030.

The memory 1050 may store the input data received by the communication interface 1010, and/or the information inferred from the input data by the processor 1030. Also, the memory 1050 may store the state information about the state in which the ANN is activated in response to the input data and/or the embedding vector generated by encoding the input data by the processor 1030.

Also, the memory 1050 may store a variety of information generated in a processing process of the processor 1030. In addition, the memory 1050 may store a variety of data and programs. The memory 1050 may include, for example, a volatile memory or a non-volatile memory. The memory 1050 may include a large-capacity storage medium such as a hard disk to store a variety of data.

Also, the processor 1030 may perform any one or any combination of the methods described above with reference to FIGS. 1 through 9 or an algorithm corresponding to at least one of the methods. The processor 1030 may be a hardware-implemented data processing device having a circuit that is physically structured to execute desired operations. For example, the desired operations may include code or instructions included in a program. The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The neural network operation apparatuses, receivers, processors, memories, encoders, normalizers, area selectors, parameter extractors, neural network operation apparatus 10, receiver 100, processor 200, memory 300, processor 200, encoder 210, normalizer 230, area selector 211, parameter extractor 213, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing software, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method using a neural network (NN), the method comprising:
   receiving input data; and
   determining information inferred from the input data based on state information about a state in which the NN is activated in response to the input data, wherein an embedding vector generated by encoding the input data using at least a portion of the NN comprises information used to reconstruct a first partial region of the input data with a first accuracy and to reconstruct a second partial region of the input data with a second accuracy, and wherein the first partial region is adaptively determined based on either one or both of the inferred information and the embedding vector.

2. The method of claim 1, wherein the determining of the inferred information comprises any one of:
determining pixel-wise information for each pixel included in the input data based on the state information;
determining a region detected in the input data in a form of a detection window based on the state information; and
determining a class classified from the input data based on the state information.

3. The method of claim 1, wherein the input data comprises either one of image data and voice data.

4. The method of claim 1, wherein
the input data is image data, and
the first partial region comprises a region of interest (ROI) corresponding to the inferred information in the image data.

5. The method of claim 1, wherein
the input data is voice data, and
the first partial region comprises a time interval of interest corresponding to the inferred information in the voice data.

6. The method of claim 1, wherein
the NN is configured to infer either one of pixel-wise information and a detection window, and
the first partial region is adaptively determined as a partial region corresponding to the inferred information.

7. The method of claim 1, wherein
the NN is configured to infer a class, and
the first partial region is adaptively determined as a partial region corresponding to the embedding vector.

8. The method of claim 1, wherein the first accuracy is greater than the second accuracy.

9. A non-transitory computer-readable storage medium storing instructions that, when executed by a processor, configure the processor to perform the method of claim 1.

10. A processor-implemented method using a neural network (NN), the method comprising:
receiving training data and a true label corresponding to the training data;
extracting an embedding vector corresponding to the training data by encoding the training data;
generating inference information of the NN by decoding the embedding vector using a first decoder;
generating reconstruction information of the training data by decoding the embedding vector using a second decoder;
determining a first loss based on a difference between the inference information and the true label;
determining a first partial region in the training data corresponding to either one or both of the true label and the embedding vector;
determining a second loss based on a difference between the training data and the reconstruction information based on the first partial region; and
training the NN based on the first loss and the second loss.

11. The method of claim 10, wherein the training of the NN comprises training the NN to reconstruct the first partial region with a first accuracy and to reconstruct a second partial region in the training data with a second accuracy, based on the first loss and the second loss.

12. The method of claim 10, wherein the first accuracy is greater than the second accuracy.

13. The method of claim 10, wherein the determining of the first partial region comprises determining, as the first partial region, a partial region in the training data corresponding to the true label so that the NN is trained to infer either one of pixel-wise information and a detection window.

14. The method of claim 10, wherein the determining of the first partial region comprises determining, as the first partial region, a partial region corresponding to the embedding vector so that the NN is trained to infer a class.

15. The method of claim 10, wherein the training of the NN comprises training the NN to determine pixel-wise information for each pixel included in the training data, based on the first loss and the second loss.

16. The method of claim 10, wherein the training of the NN comprises training the NN to determine a region detected in the training data in a form of a detection window, based on the first loss and the second loss.

17. The method of claim 10, wherein the training of the NN comprises training the NN to determine a class classified from the training data, based on the first loss and the second loss.

18. The method of claim 10, wherein the training data comprises either one of image data and voice data.

19. The method of claim 10, wherein the determining of the first partial region comprises determining the first partial region to comprise a region of interest (ROI) reconstructed in the training data, in response to the training data being image data.

20. The method of claim 10, wherein the determining of the first partial region comprises determining the first partial region to comprise a time interval of interest reconstructed in the training data, in response to the training data being voice data.

21. The method of claim 10, further comprising:
receiving input data; and
determining, using the trained NN, information inferred from the input data based on state information about a state in which the NN is activated in response to the input data,
wherein the first partial region is adaptively determined based on either one or both of the inferred information and the embedding vector.

22. An apparatus using a neural network (NN), the apparatus comprising:
a communication interface configured to receive input data; and
a processor configured to determine information inferred from the input data based on state information about a state in which the NN is activated in response to the input data,
wherein an embedding vector generated by encoding the input data using at least a portion of the NN comprises information used to reconstruct a first partial region of the input data with a first accuracy and to reconstruct a second partial region of the input data with a second accuracy, and
wherein the first partial region is adaptively determined based on either one or both of the inferred information and the embedding vector.

23. The apparatus of claim 22, wherein, for the determining of the inferred information, the processor is configured to:

determine pixel-wise information for each pixel included in the input data based on the state information;

determine a region detected in the input data in a form of a detection window based on the state information; or determine a class classified from the input data based on the state information.

24. The apparatus of claim 22, wherein the input data comprises either one of image data and voice data.

25. The apparatus of claim 22, wherein the input data is image data, and the first partial region comprises a region of interest (ROI) corresponding to the inferred information in the image data.

26. The apparatus of claim 22, wherein the input data is voice data, and the first partial region comprises a time interval of interest corresponding to the inferred information in the voice data.

27. The apparatus of claim 22, wherein the NN is configured to infer either one of pixel-wise information and a detection window, and the first partial region is adaptively determined as a partial region corresponding to the inferred information.

28. The apparatus of claim 22, wherein the NN is configured to infer a class, and the first partial region is adaptively determined as a partial region corresponding to the embedding vector.

29. The apparatus of claim 22, wherein the first accuracy is greater than the second accuracy.

30. The apparatus of claim 22, wherein the inference apparatus comprises any one or any combination of a head-up display (HUD), a three-dimensional (3D) digital information display (DID), a navigation apparatus, a 3D mobile apparatus, and a smart vehicle.

31. A processor-implemented method using a neural network (NN), the method comprising:

extracting an embedding vector by encoding training data;

determining a first loss between a ground truth of the training data and either one of inference information and a class generated based on the embedding vector;

generating reconstruction information of the training data by decoding the embedding vector;

determining a first partial region in the training data corresponding to either one of the ground truth and the embedding vector;

determining a second loss between the training data and a portion of the reconstruction information corresponding to the first partial region; and training the NN based on the first loss and the second loss.

32. The method of claim 31, further comprising:

generating the inference information by decoding the embedding vector; and generating the class by classifying the inference information, wherein the first loss is between the ground truth and either one of inference information and the class.

33. The method of claim 31, further comprising:

generating the class by classifying the embedding vector, wherein the first loss is between the ground truth and either one of inference information and the class.

34. The method of claim 31, wherein the first partial region corresponds to an adaptive weight of the ground truth, and the portion of the reconstruction information corresponding to the first partial region is determined by multiplying the reconstruction information by the adaptive weight.

35. The method of claim 31, wherein the training of the NN comprises training the NN to minimize a weighted sum of the first loss and the second loss.

* * * * *